United States Patent [19]

Krambrock

[11] Patent Number: 5,072,758
[45] Date of Patent: Dec. 17, 1991

[54] ROTARY SLIDE VALVE

[75] Inventor: Wolfgang Krambrock, Vogt, Fed. Rep. of Germany

[73] Assignee: AVT Anlagen - und Verfahrenstechnik GmbH, Vogt, Fed. Rep. of Germany

[21] Appl. No.: 533,279

[22] Filed: Jun. 4, 1990

[30] Foreign Application Priority Data

Jul. 6, 1989 [DE] Fed. Rep. of Germany ....... 3922240

[51] Int. Cl.$^5$ .............................................. F16K 5/04
[52] U.S. Cl. ............................... 137/625.47; 137/375; 251/120
[58] Field of Search ........................... 137/375, 625.47; 251/309, 120

[56] References Cited

U.S. PATENT DOCUMENTS 3,985,150 10/1976 Kindersley ....................... 137/375 X

FOREIGN PATENT DOCUMENTS 8811639 12/1988 Fed. Rep. of Germany .
3730419 3/1989 Fed. Rep. of Germany .
819648 10/1937 France .

Primary Examiner—Arnold Rosenthal
Attorney, Agent, or Firm—Spencer & Frank

[57] ABSTRACT

A rotary slide valve is proposed, in which a cylindrical rotary plug is arranged in a cylindrical bore of a housing. A round passage bore in the rotary plug allows, on the one hand, a connection without jolting in all conveying directions of the likewise aligned first and second connection lines and a connection of the first connection line to a third connection line with a branching off at an angle without a change in terms of area of the passage cross section. In order to achieve a congruent transition of the connection cross sections of the first connection line with the passage bore through the rotary plug even in the case of branching off at an angle, these two bore holes of equal dimensions meet inside the rotary plug on a planar elliptical cutting surface of a median line of the angle. In the case of straight passage through the switch, the passage bore connects the connection lines, an adapted bore hole transition being provided in the second connection line from the exit opening on a cylinder envelope surface of the rotary plug to the round pipe diameter (D) to achieve a passage without jolting in both conveying directions in the second connection line.

8 Claims, 1 Drawing Sheet

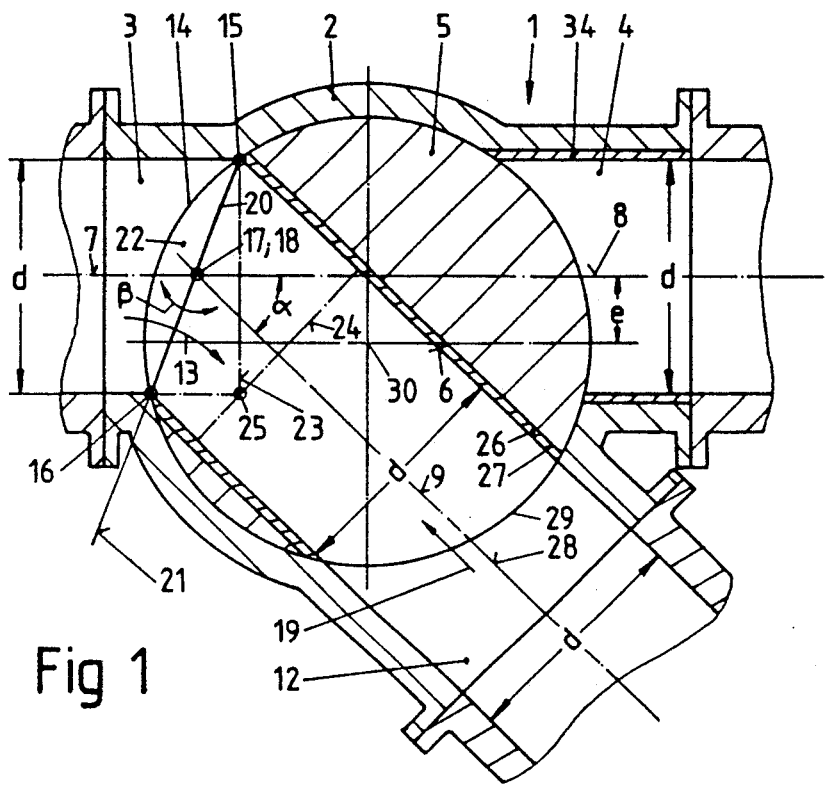
Fig 1
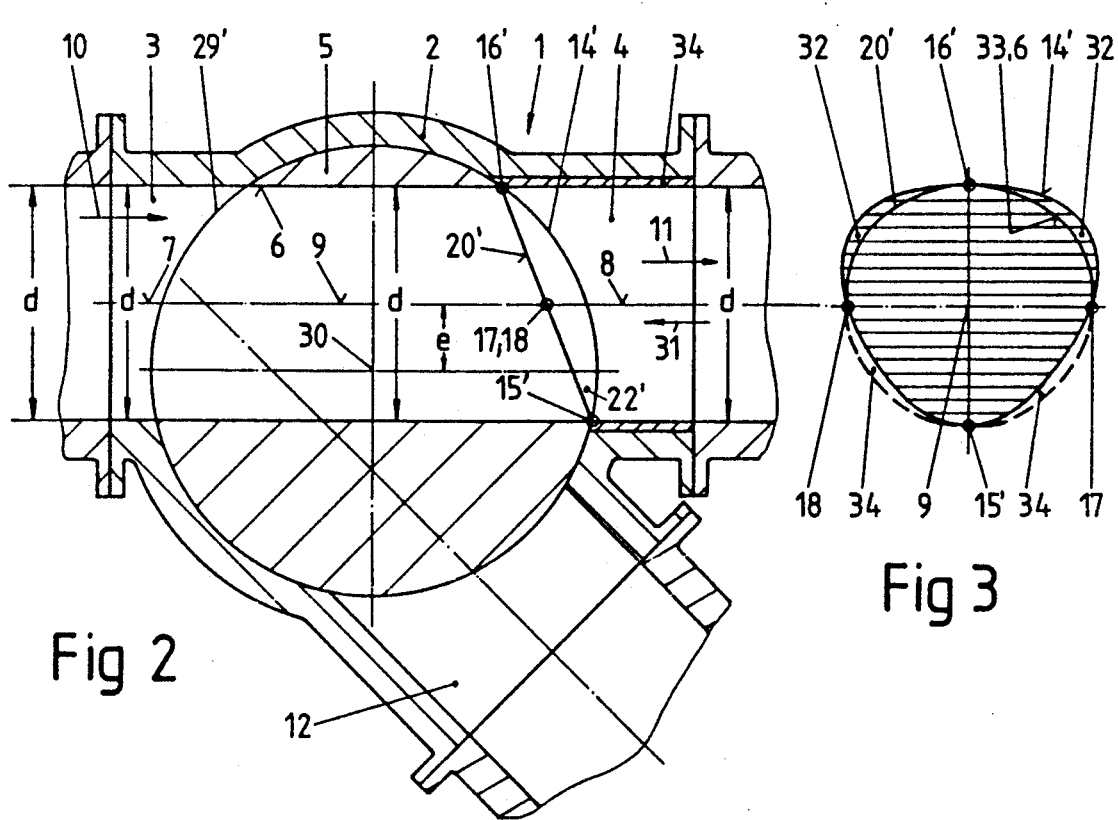
Fig 2
Fig 3

ROTARY SLIDE VALVE

BACKGROUND OF THE INVENTION

The invention relates to a rotary slide valve having a cylindrical rotary plug mounted rotatably in a stationary housing with a passage of circular cross section for the connection of three connection lines, the circular cross sections of the three connection lines and the cross section of the passage of the rotary plug being approximately equal in all passage positions of the rotary slide valve.

A rotary slide valve of the generic type is known, for example, from German Offenlegungsschrift 3,730,419. This three-way rotary slide has a cylindrical rotary plug which is mounted via the center of its two end faces rotatably in a rotary slide housing. The rotary slide valve serves for the connection of a first and second connection line, aligned with each other, and—on rotation of the rotary plug—for the connection of a third connection line branching off at an angle from the first connection line. Here, in the case of branching off at an angle the circular cross section of the first connection line and the circular cross section of the rotary plug passage bore hole adjoining it are not of congruent construction (i.e., in this valve position a change in the conveying cross section occurs at this point). As a result of this construction, passage through the valve is not possible without jolting.

A rotary slide valve of similar construction is known from German Utility Model GM 8,811,639.

In all these and also other known rotary slide valve, the cylindrical rotary plug is located in a correspondingly adapted cylindrical housing. The passage bore hole through the rotary plug is of straight-line construction and should as far as possible have the same round diameter as the different connection lines in order to avoid a change in cross section.

As can be seen from the abovementioned publications, the transition between the individual connection lines to the rotary plug takes place on the cylinder envelope surface formed by the rotary plug. In the case of the aligned, straight-line passage from the first to the second connection lines, there are no adaptation problems of the transition cross sections. However, as already mentioned, this does not apply for the position in which the rotary plug is set for branching off at an angle. Here, the difficulty or disadvantage which always results is that the branching connection cross section, lying on the cylinder envelope surface of the rotary plug, of the passage bore hole in the rotary plug does not correspond exactly or is not congruent with the connection cross section of the first connection line in the rotary slide housing. It is therefore necessary for these connection lines to be slightly padded in their lateral region in the housing in order to obtain a passage through the rotary slide valve without jolting, at least in one conveying direction. If the rotary plug is then again turned in the straight-line passage direction, the padding may no longer be necessary. Thus, it is responsible for a disadvantage in that rotary slide valve passage without jolting is now only possible in one conveying direction. A further disadvantage is that there is a restriction in the cross section in the region of the padding.

SUMMARY OF THE INVENTION

The underlying object of the invention is to propose a rotary slide valve having three connections of equal cross section which form round passages, and in which a padding of the first connection line leading to the connection line branching off is not necessary. In particular, the rotary slide valve of the invention provides an unhindered passage connecting two connection lines without jolting and without a change in cross section (i.e., in the two aligned connection lines and to the connection line branching off in all conveying directions in each case).

By improving a rotary slide valve of the type described in the introduction, the above and other objects are achieved by a rotary slide valve comprising a stationary housing and a cylindrical rotary plug rotatably mounted in the stationary housing, where the rotary plug has a passage bore of circular cross section for the connection of first and second connection lines extending from opposite sides of the stationary housing along a common axis, and on rotation of the rotary plug, for the connection of the first connection line with a third connection line extending from the stationary housing at an angle from the common axis. The circular cross sections of the first, second and third connection lines and the cross section of the passage bore are approximately equal in all passage positions of the rotary slide valve. According to the invention, the passage bore of the rotary plug includes a first passage corresponding to a connecting cross section of the first connection line and a second passage corresponding to the cross section of the passage bore wherein the connecting circular cross section of the first connection line meets the connecting cross section of the passage bore at a planar elliptical surface within the rotary plug.

The underlying central concept of the invention is that two pipes of equal diameter adjoining at any angle only form a common, congruent cutting plane if this plane lies in the plane of the median line of the intersecting longitudinal mid-axes. This construction is known from illustrative geometry as a so-called pipe bend or elbow, i.e. a pipe bend of this type is formed, for example, by cutting through a cylindrical pipe in one plane and rotating the cut off part by 180° and placing it back onto the common elliptical cutting plane. In the present invention, the contact surface of the first arriving pipeline and that of the passage bore through the rotary plug are accordingly arranged offset in such a way that they lie on the common planar elliptical cutting surface as is the case in the formation of a known pipe bend in the cutting plane of the median line. For this purpose, however, the pipe geometry or the pipe shape of the first connection line in the rotary slide housing must be continued into the segment-like section of the rotary plug up to the planar elliptical cutting surface. Furthermore, the passage bore through the rotary plug must likewise be shaped so as only to reach up to the elliptical cutting surface and not—as is otherwise customary—up to the cylinder envelope surface. Accordingly, in the present invention, the contact surface between the first arriving connection line of the rotary plug housing and the passage bore through the rotary plug bending off does not lie on the cylinder envelope surface of the plug but on the planar elliptical cutting surface of the median line with the pipe sloping off obliquely inside the rotary plug. It can only be achieved in this way that the pipelines intersecting at an angle meet congruently in a single common, namely elliptical cutting surface. A padding of the connection line in the connection housing in the regions which hitherto were not congruent, can therefore be omitted since, of course, the connection line is continued in its cross section exactly in the rotary plug up to the common congruent elliptical cutting surface.

If the rotary plug is rotated in the region of the aligned, straight-line passage between the first and second connection lines, the elliptical cutting surface adapted according to the invention passes to the second connection line due to the rotational movement of the rotary plug. Since, in this case, the connection cross section in the rotary plug does not correspond to the connection cross section in the second connection line, a corresponding geometric adaptation must be undertaken in this region in the rotary slide housing. This is done by a congruent geometric adaptation of the second connection line in the rotary slide housing in relation to the exit cross section on the circumference of the rotary plug switched for straight passage through the rotary slide valve.

The third connection line branching off at an angle is advantageously continued in a straight line in the direction predetermined by the passage bore in the rotary plug. It is possible by this means for the rotary plug bore and the third connection line to be continued with its bore aligned in a straight line, i.e. the congruent passage cross sections of the two bore holes again abut on the cylinder envelope surface of the rotary plug. If this opening is swivelled towards the first connection line to form an aligned passage, congruent passage cross sections are again present on the cylinder envelope surface.

The eccentric offset of the center line of the circle of the rotary plug in relation to the parallel pipe mid-axis of the aligned first and second connection lines provides the advantageous connection possibility of the rotary plug with an equally large inside bore as that of the connection lines.

Furthermore, the use of a cylindrical bush for the rotary plug is advantageous, having a cast pipe bend geometry corresponding to the previous descriptions.

Further advantages and details according to the invention are specified in the following description of the invention and described in greater detail with reference to the description of the figures.

BRIEF DESCRIPTION OF THE DRAWINGS

FIG. 1 shows a rotary slide valve according to the invention with an angled-off passage position of the rotary plug, FIG. 2 shows the rotary slide valve according to FIG. 1 in straight-line passage position and FIG. 3 shows a projection of the cross sections in the region of the second connection line to the rotary plug according to FIG. 2.

DESCRIPTION OF THE PREFERRED EMBODIMENT

The rotary slide valve 1 illustrated in FIGS. 1 and 2 consists of a stationary housing 2 having a first connection line 3 and a further connection line 4, aligned with the former, with the same diameter d, which connection lines can be interconnected via a passage bore 6 in the rotary plug 5 in the flush position according to FIG. 2. In this case, the passage bore 6 of the rotary plug likewise has the diameter d. The mid-axis 7 of the pipe of the first connection line 3 and the mid-axis 8 of the pipe of the second connection line 4 are aligned with the mid-axis 9 of the passage bore of the rotary plug 5 in the position according to FIG. 2. Correspondingly, according to FIG. 2, the material transport takes place from the first connection line 3 (arrow 10) via the passage bore 6 of the rotary plug 5 to the second connection line 4 (arrow 11) or vice versa (arrow 31). In the case of a straight-line passage of this type, the rotary plug only requires a straight-line round passage bore 6, which is unchanged in cross section, as is known from the prior art.

In the position of the rotary slide switch according to FIG. 1, the flow of material is to be transported from the first connection line 3 to the third connection line 12 branching off, i.e. in the direction of the arrow 13 or vice versa (arrow 19). For this purpose, the rotary plug passage bore 6 is correspondingly angled off such that the mid-axis 9 of the passage bore of the rotary plug encloses an angle $\alpha$ with the aligned mid-axes 7, 8 of the first and second connection pipes. The conjugate angle to 180° is denoted as $\beta$.

In normal, known rotary slide valve, the pipe cross sections of the first connection line 3 and the rotary plug passage bore 6 meet on the three-dimensional cylinder envelope surface 14 of the rotary plug 5. The two pipe cross sections of the connection line 3 located opposite one another on the cylinder envelope surface 14 and the passage bore 6 are, however, only congruent at the upper point 15 illustrated in FIG. 1 and the lower point 16 due to the different cylinder cuts. Otherwise, the cross sections of the connection line 3 and the rotary plug passage bore 6 are not congruent in the region of the cylinder envelope contact surface 14, except at the two opposite points 17, 18. Thus in the case of known rotary slide valve, a padding of the pipe interior of the first connection line is necessary in certain regions in order to obtain a passage without jolting through the rotary slide valve at least in conveying direction 13. However, this padding of the connection line 3 which compensates for the different passage cross sections along the cylinder envelope surface 14 has the disadvantage that it restricts the cross section and that, with a flow of the material from the third connection line 12 to the first connection line 3 (arrow 19), the joining edge of the material padding in the first connection line is counter to the material flow.

According to the invention, the contact plane of the first connection line 3 and the rotary plug passage bore 6 is therefore placed, in the manner of a known pipe bend, away from the cylinder envelope surface 14 onto the planar elliptical cutting surface 20, as two abutting pipes 3, 6 of equal dimensions only have a common congruent elliptical cutting plane 20 if this cutting plane 20 lies on the median line 21 of the angle $\beta$. In this case, $\beta = 180° - \alpha$.

This finding known from illustrative geometry is transferred according to the invention to the construction of a rotary slide valve. For this purpose, the pipe geometry of the first connection line 3 must be continued spatially into the segment 22 of the rotary plug 5 up to the cutting line of the elliptical cutting surface 20 on the median line 21. Equally, the pipe geometry of the passage bore 6 through the rotary plug 5 must also only reach up to the elliptical cutting surface 20 on the median line 21. In one approach, the elliptical surface of passage bore 6 could be formed, for example, by inserting a drilling tool with the diameter d along the mid-axis 7 of the pipe up to the plane 23 drawn in FIG. 1 in order to reach the top point 15. However, it can be seen from this that the passage bore 6 might only be continued up to the plane 24 so that the two planes 23, 24 meet at a common point 25. A further advance of the two bore holes would have the effect that these would influence each other, i.e. would lead in each case to shapings in the other bore hole. The rotary plug 5 having a first passage bore 6 up to the planar elliptical surface 20 and a second bore 3 extended through the segment 22 up to the same plane 20 is therefore produced as a casting or insertion part in the rotary plug, as it cannot be produced mechanically by hollowing, in order to obtain the special bent bore hole shape. For this purpose, the core of the casting or the insertion part is constructed in accordance with the described shaping of the two bore holes 3, 6, with a common contact plane along the planar elliptical cutting surface 20 on the median line 21 of the angle $\beta$.

If, for technical reasons, the wall of passage bore 6 has to consist of a high-grade material, it is particularly expedient for cost reasons to use a cast cylindrical bush 26. This cylindrical bush 26 has in its inner region the pipe geometry described above, i.e. an inside contour which, on the one hand, is constructed as an inner cylindrical surface of the inside bore 6 of the rotary plug up to the cutting plane 20 and, on the other hand, as an extension of the bore 3 into the segment section 22 likewise up to the cutting surface 20. The outside contour 27 of the cylindrical bush 26 can be consistently cylindrical such that it can be fitted into a corresponding cylindrical passage bore hole in the rotary plug 5. In this case, the smallest possible cylinder diameter on the outside contour 27 must be larger than twice the largest radius of the mid-axis 9 of the pipe up to the pipe wall of the segment 22 on the cylinder envelope surface 14 of the rotary plug 5. The cylindrical bush 26 is cast with a core part which has the shaping of the pipe bend described above having the common elliptical cutting surface 20 on the median line 21 of the two connection pipes 3, 6. However, the cylindrical bush 26 can also be cast in total in a rotary plug 5 as a pipe bend with a bent outside contour. The cylindrical bush 26 could also be produced from a cut pipe bend which would be able to be inserted into a rotary plug which is hollow inside.

As can be seen in FIG. 1, the third connection line 12 is continued in a straight line with the rotary plug 5 branching off at an angle, the mid-axis 9 of the pipe of the rotary plug being aligned with the mid-axis 28 of the pipe of the third connection line 12. The diameter d of the third connection line 12 corresponds to that of the two connection lines 3 and 4. Due to this straight-line connection of the connection line 12 to the passage bore 6 of the rotary plug 5, a transition of the two bore holes 6, 12 without jolting is achieved along the cylinder envelope surface 29 such that, at this point, no adaptation measures are required either on the rotary plug or on the connection line of the rotary slide housing 2 to match the bore holes 6, 12. Accordingly, there is a congruent passage cross section on the cylinder envelope surface 29.

FIG. 2 shows the straight-line passage position through the rotary slide valve, i.e. the first connection line 3 is connected via the rotary plug bore 6 to the second connection line 4. For this purpose, the rotary plug 5 was rotated according to FIG. 1 in clockwise direction about the center point 30 of the circle by the angle $\beta$ such that the cylinder envelope surface 14 passes into the opening of the second connection line 4 and the cylinder envelope surface 29 into the opening of the first connection line 3. The two cylinder envelope surfaces are denoted as 14' and 29' in FIG. 2.

The opening region on the cylinder envelope surface 29' is aligned with the opening of the first connection line 3 in the case of straight-line passage of the rotary slide switch (FIG. 2), which means that the two opening cross sections 3, 6 are congruent in the cylinder envelope surface 29'. This corresponds to the position of the rotary plug transition 29 in FIG. 1 to the third connection line 12.

In order to achieve the matching and construction of a pipe bend according to FIG. 1 having the elliptical planar cutting surface 20, the segment 22 in the rotary plug 5 was constructed as a straight-line continuation of the bore of the first connection line 3. If this segment 22 from FIG. 1 is then rotated about the center point 30 of the circle and by the angle $\beta$ into the position according to FIG. 2 (segment 22'), the upper intersection 15 of the elliptical cutting surface 20 in FIG. 2 moves downwards (point 15') and the lower intersection 16 from FIG. 1 moves into the upper position (point 16') in FIG. 2. The two lateral points 17, 18 remain in their horizontal position on the mid-axis 9 of the pipe.

FIG. 3 shows the projection or the lateral view (direction of view: arrow 31) of the opening cross sections of the cylinder envelope surface 14', which from this view is heart-shaped, and of the circular connection pipe 6. It can be seen from this figure that, at this point in the rotary slide housing 2, an adaptation of the two different cross sectional transitions is necessary in order to obtain a valve passage without jolting in both conveying directions.

In the upper lateral region along the two segments 32, the cutting surface 14' is larger, due to the heart-shaped form, than the circular cross section 33 of the passage bore 6 in the rotary plug 5. Conversely, in the two lower lateral segment regions 34 the circular pipe cross section (circle 33) of the passage bore 6 of the rotary plug 5 extends outside the contour of the heart-shaped passage cross section 14'. In the regions 32, 34, the connection line 4 must therefore be adapted, starting from the cross section 33, in the direction of the arrow 31 to the opening cross section of the segment 22' on the plane 14'.

It is achieved by this embodiment that even in the aligned position of the connection lines 3 and 4 according to FIG. 2, a material transport can take place in both directions (arrow 10, 11 and 31) without there being a change in cross section. In particular, the cross sections according to the illustration according to FIG. 3 are compensated in their effective cross sectional area in the transition between the connection line 4 and the cylinder envelope surface 14' such that no change in cross section occurs. This can be seen from the corresponding almost equal areas of the segments 32 and of the segments 34. The adaptation of the of connection line 4 to the cross section 14' can also take place in the form of a cast cylindrical bush 34 which can be produced in particular from high-grade material.

Furthermore, an unhindered passage without padding of the first connection line 3 is provided even with the rotary slide valve branching off to the third connection line 12, i.e. a transition without jolting is guaranteed in all directions according to the invention by the formation of the pipe bend in the rotary plug 5.

The invention is not restricted to the exemplary embodiment described and illustrated. Rather, it also comprises all expert and expedient developments without their own inventive content.

I claim:

1. A rotary slide valve comprising:
   a stationary housing having first, second and third connection lines extending therefrom, the first and second lines extending from opposite sides of the housing along a common axis, the third connection line extending from the housing along a branched off axis at an angle from the common axis, each connection line having a circular cross-section; and
   a cylindrical rotary plug rotatably mounted in the stationary housing, said rotary plug having a passage bore of circular cross section for the connection of the first and second connection lines and, on rotation of the plug, for the connection of the first connection line with the third connection line, the circular cross sections of the three connection lines and the cross section of the passage bore being approximately equal in all passage positions of the rotary slide valve,
   wherein the passage bore of the rotary plug includes a first passage and a second passage which form an elbow, the first passage extends from one side of the rotary plug and corresponds to the circular cross section of the first connection line and the second passage extends from the other side of the rotary plug, said first passage meeting with said second passage at a planar elliptical surface within said cylindrical rotary plug.

2. A rotary slide valve as claimed in claim 1, wherein the passage bore of the rotary plug has a cylindrical bush disposed in a cylindrical passage bore hole, which bush is constructed on its inner envelope surface as an elbow with the planar elliptical surface being disposed on the median line of the conjugate angle extending from the common axis to the branched off axis.

3. A rotary slide valve as claimed in claim 2, wherein the cylindrical bush is constructed as a casting made of a different material from that of the rotary plug.

4. A rotary slide valve as claimed in claim 1, wherein the elbow of the passage bore is constructed of two pipes welded together and made of high-grade material, such as Cr-Ni steel, the elbow being bonded or welded in the rotary plug.

5. A rotary slide valve as claimed in claim 1, wherein the second connection line in the stationary housing is constructed with a transition surface towards the rotary plug, which transition surface is heart-shaped in projection and has an exit opening, which is heart-shaped in projection, on the cylinder envelope surface of the rotary plug which passes into the round pipe diameter (d) of the second connection line and of the passage bore.

6. A rotary slide valve as claimed in claim 1, wherein the third connection line branching off at an angle has a dimension (d) and is continued in a straight line through the stationary housing at least in the region of the rotary plug exit bore and is continued in alignment with the latter without jolting to form a common opening cross section with the passage bore in the rotary plug.

7. A rotary slide valve as claimed in claim 1, wherein the common axis of the aligned first and second connection lines and the longitudinal mid-axis of the passage bore of the rotary plug when aligned with the first and second connection lines are arranged eccentrically by an eccentricity amount and parallel next to the associated center line of the circle through the center point of the stationary housing for the rotary plug.

8. A rotary slide valve as claimed in claim 5, wherein the transition surface of the second connection line includes a cast cylindrical bush made of a different material than that of the stationary housing which is inserted in the second connection line.

* * * * *